(12) United States Patent
Axmon et al.

(10) Patent No.: US 11,700,629 B2
(45) Date of Patent: Jul. 11, 2023

(54) METHOD OF ADAPTING RADIO RESOURCES, DEVICE AND COMPUTER PROGRAM

(71) Applicant: Telefonaktiebolaget LM Ericsson (publ), Stockholm (SE)

(72) Inventors: Joakim Axmon, Limhamn (SE); Torgny Palenius, Barsebäck (SE); Håkan Palm, Växjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 775 days.

(21) Appl. No.: 15/753,014

(22) PCT Filed: Aug. 19, 2016

(86) PCT No.: PCT/EP2016/069676
§ 371 (c)(1),
(2) Date: Feb. 15, 2018

(87) PCT Pub. No.: WO2017/032701
PCT Pub. Date: Mar. 2, 2017

(65) Prior Publication Data
US 2018/0234984 A1 Aug. 16, 2018

Related U.S. Application Data

(60) Provisional application No. 62/209,070, filed on Aug. 24, 2015.

(51) Int. Cl.
*H04L 1/20* (2006.01)
*H04W 72/541* (2023.01)
(Continued)

(52) U.S. Cl.
CPC .......... *H04W 72/541* (2023.01); *H04L 1/001* (2013.01); *H04L 1/20* (2013.01); *H04W 72/542* (2023.01);
(Continued)

(58) Field of Classification Search
CPC ......... H04L 1/001; H04L 1/20; H04L 1/0026; H04L 1/08; H04W 72/085; H04W 72/082;
(Continued)

(56) References Cited

U.S. PATENT DOCUMENTS 9,357,546 B1* 5/2016 Marupaduga ..... H04W 72/1284
2004/0264561 A1* 12/2004 Alexander .......... H04L 27/2662
375/232

(Continued)

FOREIGN PATENT DOCUMENTS

WO 2014055878 A1 4/2014
WO 2014110784 A1 7/2014
(Continued)

OTHER PUBLICATIONS

Xu et al. (U.S. Appl. No. 62/115,110, provisional of US 2016/0234856 A1), USPTO, whole document (Year: 2015).*
(Continued)

*Primary Examiner* — Michael Thier
*Assistant Examiner* — Jose L Perez
(74) *Attorney, Agent, or Firm* — Sage Patent Group (57) ABSTRACT

A method of adapting radio resources based on physical conditions in a device for wireless communication is disclosed. The method comprises determining radio conditions, mapping the radio conditions to a metric, reporting the radio conditions to a handler of radio resources, and using the reported radio conditions and their mappings to the metric by the handler for radio resource operations. A device for
(Continued)

wireless communication and a computer program are also disclosed.

21 Claims, 8 Drawing Sheets

(51) Int. Cl.
*H04L 1/00* (2006.01)
*H04W 72/542* (2023.01)
*H04W 24/00* (2009.01)
*H04L 1/08* (2006.01)

(52) U.S. Cl.
CPC .............. *H04L 1/0026* (2013.01); *H04L 1/08* (2013.01); *H04W 24/00* (2013.01)

(58) Field of Classification Search
CPC .. H04W 24/00; H04W 72/541; H04W 72/542
See application file for complete search history.

(56) References Cited

U.S. PATENT DOCUMENTS

| | | | |
|---|---|---|---|
| 2007/0071122 A1* | 3/2007 | Ling | H04L 27/0012 375/260 |
| 2013/0260763 A1* | 10/2013 | Bhattad | H04W 36/0088 455/436 |
| 2014/0200001 A1* | 7/2014 | Song | H04W 36/0094 455/436 |
| 2014/0302869 A1* | 10/2014 | Rosenbaum | H04W 4/026 455/456.1 |
| 2015/0043445 A1* | 2/2015 | Xiong | H04L 5/006 370/329 |
| 2015/0085717 A1* | 3/2015 | Papasakellariou | H04L 5/0044 370/280 |
| 2015/0117410 A1* | 4/2015 | Wu | H04L 1/08 370/331 |
| 2015/0215911 A1* | 7/2015 | Dimou | H04W 48/12 370/329 |
| 2015/0223178 A1* | 8/2015 | Pietraski | H04L 5/001 370/252 |
| 2015/0296400 A1* | 10/2015 | Yang | H04W 16/32 370/252 |
| 2016/0165640 A1* | 6/2016 | Yang | H04W 74/08 370/336 |
| 2016/0226649 A1* | 8/2016 | Papasakellariou | H04L 1/0001 |
| 2016/0234856 A1* | 8/2016 | Xu | H04B 17/318 |
| 2016/0286580 A1* | 9/2016 | Liu | H04W 74/0833 |
| 2016/0316491 A1* | 10/2016 | Axmon | H04L 5/0058 |
| 2017/0006572 A1* | 1/2017 | Lee | H04W 60/06 |
| 2017/0027011 A1* | 1/2017 | Chae | H04W 52/383 |
| 2017/0303316 A9* | 10/2017 | Chung | H04W 4/70 |
| 2017/0366999 A1* | 12/2017 | Tsuboi | H04W 88/02 |
| 2018/0063722 A1* | 3/2018 | Lee | H04L 1/08 |
| 2018/0077722 A1* | 3/2018 | Awad | H04W 72/0446 |
| 2018/0092062 A1* | 3/2018 | Chen | H04W 68/00 |
| 2018/0115925 A1* | 4/2018 | Moroga | H04W 72/1257 |
| 2018/0160346 A1* | 6/2018 | Lee | H04W 48/16 |
| 2018/0213484 A1* | 7/2018 | Oh | H04W 72/044 |
| 2020/0229063 A1* | 7/2020 | Wang | H04W 36/0085 |

FOREIGN PATENT DOCUMENTS

| | | | | |
|---|---|---|---|---|
| WO | 2015012654 A1 | 1/2015 | | |
| WO | 2015060756 A1 | 4/2015 | | |
| WO | 2015115964 A1 | 8/2015 | | |
| WO | 2015116870 A1 | 8/2015 | | |
| WO | WO-2015116732 A1 * | 8/2015 | ............. | H04W 4/70 |
| WO | WO-2015116870 A1 * | 8/2015 | ........ | H04W 36/0069 |
| WO | WO-2015172856 A1 * | 11/2015 | ............. | H04W 24/02 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer; Measurements (Release 11)" 3GPP TS 36.214 V11.1.0, Dec. 2012, pp. 1-14, 3GPP.

Alcatel-Lucent et al., "Considerations on idle mode Paging for LC-MTC", 3GPP TSG-RAN WG2 Meeting #89-bis, Apr. 20-24, 2015, pp. 1-4, Bratislava, Slovakia, R2-151452.

Ericsson, "Connected mode Mobility for LC and CE", 3GPP TSG-RAN WG2 #91, Aug. 24-28, 2015, pp. 1-3, Beijing, China, Tdoc R2-153713.

Khan, R. et al., "An Adaptive RRM Scheme for Smart Grid M2M Applications over a WiMAX Network", 2014 9th International Symposium on Communication Systems, Networks & Digital Sign (CSNDSP), Jul. 23-25, 2014, pp. 820-825.

\* cited by examiner

METHOD OF ADAPTING RADIO RESOURCES, DEVICE AND COMPUTER PROGRAM

TECHNICAL FIELD

The present invention generally relates to a method of adapting radio resources based on physical conditions in a device for wireless communication, such a device and a computer program for implementing the method.

BACKGROUND

There is a need for efficient and cost-effective devices or terminals in cellular communications networks, especially in Machine-to-Machine (M2M) communications. In M2M communications, a Machine Type Communication (MTC) device (e.g., a smart meter, a signboard, a camera, a remote sensor, a laptop, an appliance, etc.) is expected to be of low cost and low complexity. A low complexity UE envisioned for M2M operation may implement one or more low cost features like smaller downlink and uplink maximum transport block size (e.g., 1000 bits) and/or reduced downlink channel bandwidth of 1.4 megahertz (MHz) for data channel (e.g., Physical Downlink Shared Channel (PDSCH)). A low cost UE may also comprise of a Half-Duplex Frequency Division Duplex (HD-FDD) and one or more of the following additional features: single receiver (1 receiver) at the UE, smaller downlink and/or uplink maximum transport block size (e.g., 1000 bits), and reduced downlink channel bandwidth of 1.4 MHz for data channel. The low cost UE may also be termed as a low complexity UE.

MTC may benefit from enhanced coverage. The path loss between a M2M device and a base station can be very large in some scenarios such as when used as a sensor or metering device located in a remote location such as in a basement of a building. In such scenarios the reception of a signal from the base station is very challenging. For example, the path loss can be worse than 20 decibels (dB) compared to normal operation. In order to cope with such challenges, the coverage in the uplink and/or in the downlink has to be substantially enhanced. This is realized by employing one or a plurality of advanced techniques in the UE and/or in the radio network node (e.g., the base station) for enhancing the coverage. Some non-limiting examples of such advanced techniques are (but are not limited to) transmit power boosting, repetition of transmitted signal, applying additional redundancy to the transmitted signal, use of advanced/enhanced receiver, etc. In general, when employing such coverage enhancing techniques, the M2M device is regarded to be operating in coverage enhancing mode.

A low complexity UE (e.g., a UE with 1 receiver) may also be capable of supporting an enhanced coverage mode of operation.

Enhanced coverage may require considerations regarding acquisition of related system information. The UEs are required to detect SI of neighbouring cells in Evolved Universal Terrestrial Radio Access (E-UTRA). Examples of these are Master Information Block (MIB) and System Information Block (SIB), and there are different types of SIBs; namely, SIB1 and SIB2. The MIB is transmitted on the Physical Broadcast Channel (PBCH) while SIB1 is multiplexed into the PDSCH channel. The MIB is transmitted in subframe #0 with a periodicity of 40 milliseconds (ms) and four redundancy versions are transmitted within this period. SIB1 is transmitted on subframe #5 and has a periodicity of 80 ms.

The MIB, which is transmitted on the Broadcast Channel (BCH), contains a limited amount of SI which is necessary for the UE to read the SI. The MIB is transmitted on subframe #0 every 40 ms. The MIB may include the following types of information:
Information related to Downlink (DL) bandwidth;
Information related to Physical Hybrid Automatic Repeat Request (HARM) Indication Channel (PHICH); PHICH is necessary to be able to read a Physical Downlink Control Channel (PDCCH); and/or
System Frame Number (SFN).

SIB, on the other hand, contains the large part of the SI and it is transmitted on subframe #5 every 80 ms. In Long Term Evolution (LTE), there are numerous types of SIBs that contain different types of information. The received SI is valid for a certain time and the network node notifies the UE about the change of SI using paging. By reading the paging messages, the UE knows exactly when the SI is expected to change and it also knows about the modification period boundary specified using SFN values. The SIB is transmitted on the Downlink Shared Channel (DL-SCH) and indicated to the UE using the PDCCH and tag SI Radio Network Temporary Identifier (SI-RNTI). Examples of SIBs are SIB1, SIB2, SIB3, and SIB4-SIB8, and their contents are as follows:
SIB1 contains information related to operator and information on whether the UE is allowed to camp on it, and subframe configurations; and
SIB2 contains information necessary for the UE to access the cell, e.g. Uplink (UL) cell bandwidth, parameters needed for random access, and parameters related to UL power control.

Two approaches that may be considered for a solution including an enhanced coverage operation mode are:
RSRP-based classification of coverage scenario, and
Cell detection-based classification of coverage scenario.

There are issues with both of them, relating to tolerances and diversity of MTC implementations. For RSRP-based detection the tolerance of (at least)+−7 dB causes an identical uncertainty in the classification of coverage scenario, even making it challenging for the wireless device to determine whether it shall operate in normal or enhanced coverage mode, and it would not make sense to divide the enhanced coverage mode into zones. Moreover, link simulations carried out in RAN4 show that an RSRP measurement approach that works well at one extreme (low SINR) does not work well for slowly fading radio conditions at the other extreme (high SINR). Moreover, different solutions may provide highly different results, stemming from different architectures and philosophies concerning mobility measurements.

For a cell detection time-based approach, the main problem is that there are traditionally two main strategies: either search often and shallow and by that way identify a new cell when it becomes strong enough to report or monitor for a potential handover, or search sparsely but deeply to detect the same neighbour cell earlier, at lower level, well before it comes into the SINR range when it is to be reported or monitored for handover. The cell detection time becomes very different for the two approaches, and hence it is not suitable to use for classification of the coverage scenario.

Some methodology needs to be defined that allows diverse MTC implementations as long as they display an agreed behaviour.

SUMMARY

The invention is based on the inventors' realization that a metric can be used, e.g. a standardised and/or directly measurable metric, through an interface between physical and radio resource layers although the measurements may be from a more or less complex set of measurement which then are mapped on the metric used over the interface.

According to a first aspect, there is provided a method of adapting radio resources based on physical conditions in a device for wireless communication. The method comprises determining radio conditions, mapping the radio conditions to a metric, reporting the radio conditions to a handler of radio resources, and using the reported radio conditions and their mappings to the metric by the handler for radio resource operations.

The determining of radio conditions may comprise measuring reference signal received power, RSRP.

The determining of radio conditions may comprise measuring reference signal received quality, RSRQ.

The determining of radio conditions may comprise analysing message decoding statistics.

The determining of radio conditions may comprise determining cell detection times.

The determining of radio conditions may comprise analysing interference history.

The mapping of the radio conditions to a metric may comprise mapping the radio conditions to RSRP.

The mapping of the radio conditions to a metric may comprise mapping the radio conditions to RSRQ.

The mapping of the radio conditions to a metric may comprise mapping the radio conditions to signal-to-interference-and-noise ratio of reference signals, RS-SINR.

The handler of radio resources may be operative to handle radio resource control, RRC.

The handler of radio resources may be operative to handle radio link management, RLM.

The handler of radio resources may be operative to handle radio resource management, RRM.

The handler of radio resources may be operative to handle cell selection.

The handler of radio resources may be operative to handle cell re-selection.

The handler of radio resources may be operative to handle initial physical random access channel, PRACH, repetition.

The handler of radio resources may be operative to handle initial physical random access channel, PRACH, transmit power selection.

The handler of radio resources may be operative to handle mobility measurement reporting.

The handler of radio resources may be operative to handle mobility measurement logging.

The handler of radio resources may be operative to handle coverage reporting.

The method may comprise determining whether the device is to operate in a conventional operation mode or an enhanced coverage operation mode, wherein if the device is to operate in the enhanced coverage operation mode, the using of the reported radio conditions and their mappings to the metric by the handler for radio resource operations comprises operating based on the metric to which the radio conditions are mapped, and if the device is to operate in the conventional operation mode, the using of the reported radio conditions and their mappings to the metric by the handler for radio resource operations comprises operating based on metrics provided by the reported radio conditions.

According to a second aspect, there is provided a device arranged for wireless communication comprising a determinator arranged to determine radio conditions, a mapper arranged to map the radio conditions to a metric, a handler of radio resources, and an interface arranged to enable the determinator and mapper to report the radio conditions to the handler of radio resources. The handler is arranged to use the reported radio conditions and their mappings to the metric by the handler for radio resource operations.

The determinator may be arranged to measure reference signal received power, RSRP.

The determinator may be arranged to measure reference signal received quality, RSRQ.

The determinator may be arranged to analyse message decoding statistics.

The determinator may be arranged to determine cell detection times.

The determinator may be arranged to analyse interference history.

The mapper may be arranged to map the radio conditions to RSRP.

The mapper may be arranged to map the radio conditions to RSRQ.

The mapper may be arranged to map the radio conditions to signal-to-interference-and-noise ratio of reference signals, RS-SINR.

The handler of radio resources may be operative to handle radio resource control, RRC.

The handler of radio resources may be operative to handle radio link management, RLM.

The handler of radio resources may be operative to handle radio resource management, RRM.

The handler of radio resources may be operative to handle cell selection.

The handler of radio resources may be operative to handle cell re-selection.

The handler of radio resources may be operative to handle initial physical random access channel, PRACH, repetition.

The handler of radio resources may be operative to handle initial physical random access channel, PRACH, transmit power selection.

The handler of radio resources may be operative to handle mobility measurement reporting.

The handler of radio resources may be operative to handle mobility measurement logging.

The handler of radio resources may be operative to handle coverage reporting.

The device may be arranged to determine whether the device is to operate in a conventional operation mode or an enhanced coverage operation mode, wherein if the device is to work in the enhanced coverage operation mode, the handler is arranged to use the reported radio conditions and their mappings to the metric by operating based on the metric to which the radio conditions are mapped, and if the device is to work in the conventional operation mode, the handler is arranged to use the reported radio conditions and their mappings to the metric by operating based on metrics provided by the reported radio conditions.

According to a third aspect, there is provided a computer program comprising instructions which, when executed on a processor of a communication apparatus, causes the communication apparatus to perform the method according to the first aspect.

One or more of the embodiments may allow MTC designs to combine metrics from different sources to determine the radio conditions, including the coverage.

One or more of the embodiments may allow layer 3, L3, procedures to operate on similar quantities as for other device categories, i.e., it hides the exact method used in layer 1, L1, and design may be more freely made and independent between the layers.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Current work in the standardization of 3GPP EUTRA (evolved universal terrestrial radio access) aims at defining a class of MTC (machine type communication) devices that are capable of operating outside the normal coverage, in so called enhanced coverage (EC) mode. Devices operating in enhanced coverage shall be able to receive and successfully decode broadcast and unicast transmissions at 15-20 dB lower SNR (signal to noise ratio) than currently specified for legacy devices (i.e. UEs (user equipment) and MTC devices fulfilling the standard up to and including 3GPP EUTRA Rel.12). The devices shall also be capable of measuring RSRP (reference signal received power) and RSRQ (reference signal received quality) of serving cell and neighbour cells under requirements on measurement accuracy. The acceptable tolerance is under discussion but will most likely be on par or looser than the tolerances for UE category 0 introduced in 3GPP EUTRA Rel.12; e.g. RSRP tolerance of ±7 dB for $\hat{E}s/Iot \geq -6$ dB at low power levels (up to −70 dBm over the received bandwidth) and ±9 dB at high power levels (between −70 and −50 dBm over the received bandwidth); see excerpt from 3GPP TS 36.133 V12.4.0 below in Table.

TABLE

| RSRP Intra frequency absolute accuracy for UE category 0 | | | | | | |
|---|---|---|---|---|---|---|
| Accuracy | | | Conditions | | | |
| | | | | $I_o$ [Note 1] range | | |
| Normal condition dB | Extreme condition dB | $\hat{E}s/Iot$ dB | E-UTRA operating band groups [Note 3] | Minimum $I_o$ dBm/15 kHz [Note 2] | dBm/ $BW_{Channel}$ | Maximum $I_o$ dBm/ $BW_{Channel}$ |
| ±7 | ±10 | ≥−6 dB | FDD_A, TDD_A | −121 | N/A | −70 |
| | | | FDD_C, TDD_C | −120 | N/A | −70 |

TABLE-continued

| RSRP Intra frequency absolute accuracy for UE category 0 | | | | | | |
|---|---|---|---|---|---|---|
| Accuracy | | | Conditions | | | |
| | | | | $I_o$ [Note 1] range | | |
| Normal condition dB | Extreme condition dB | $\hat{E}s/Iot$ dB | E-UTRA operating band groups [Note 3] | Minimum $I_o$ dBm/15 kHz [Note 2] | dBm/ $BW_{Channel}$ | Maximum $I_o$ dBm/ $BW_{Channel}$ |
| | | | FDD_D | −119.5 | N/A | −70 |
| | | | FDD_E, TDD_E | −119 | N/A | −70 |
| | | | FDD_F | −118.5 | N/A | −70 |
| | | | FDD_G | −118 | N/A | −70 |
| | | | FDD_H | −117.5 | N/A | −70 |
| | | | FDD_N | −114.5 | N/A | −70 |
| ±9 | ±12 | ≥−6 dB | FDD_A, TDD_A, FDD_C, TDD_C, FDD_D, FDD_E, TDD_E, FDD_F, FDD_G, FDD_H, FDD_N | N/A | −70 | −50 |

NOTE 1: $I_o$ is assumed to have constant EPRE across the bandwidth.
NOTE 2: The condition level is increased by Δ > 0, when applicable, as described in Sections B.4.2 and B.4.3.
NOTE 3: E-UTRA operating band groups are as defined in Section 3.5.

The requirements are set based on the assumption on that devices of the class UE category 0 are using a single receiver antenna, and the same assumption applies for low-cost MTC devices in enhanced coverage, however, since the MTC-EC device is to operate at even lower SINR (signal to interference and noise) than specified for UE category 0, it is not unlikely that the tolerance will be even larger than ±7 dB for $\hat{E}s/Iot < -6$ dB—not for non-linearity as in the case for high power—but for the relatively increased noise level.

Enhanced coverage also puts stress on the UL communication since the transmissions by the device will be equally hard for the network node to receive and successfully decode. The network node has an advantage since it is scheduling the MTC device and hence knowns when MTC transmissions are expected, but there is one exception: the random access.

To facilitate reliable communication in enhanced coverage mode of operation, repetitions of transmissions are planned, thereby improving the probability of successful decoding. Also the random access procedure is intended to rely on repetitions, where the MTC device is to send a PRACH (physical random access channel) preamble multiple times, where the number of repetitions depends on the experienced coverage. The MTC device is to determine whether it is in normal coverage or enhanced coverage, where for the latter up to three different zones with respect to SNR are to be distinguished. The ambition is to improve the random access procedure without draining the wireless device's battery or random access capacity by having more repetitions than necessary.

At initial access a wireless device first detects the cell and then reads the Master Information Block and two system information blocks (SIB1 and SIB2) in order to acquire the information needed for executing the random access procedure.

A condensed description of embodiments may comprise the following operations:

1. The radio conditions are determined by a method, or a combination of methods, of choice (e.g. functions comprising or operating on RSRP measurements, RSRQ measurements, RS-SINR measurements, message decoding statistics, cell detection times, analysis of interference, history, etc.)

2. The determined radio conditions are mapped to RSRP and/or RSRQ and/or RS-SINR in L1 (physical layer) and reported to L3 (radio resource control, radio link monitoring, radio resource management).

3. The mapped and reported RSRP and/or RSRQ and/or RS-SINR are used by one or more procedures that is executed directly or indirectly by L3 (e.g. cell selection, cell re-selection, initial PRACH repetition and/or initial PRACH transmit power selection, mobility measurement reporting, mobility measurement logging, coverage reporting etc.)

Consistent LC MTC EC device behaviour is secured through compliance test cases, where the mapped value or derivative thereof shall be within a standardized tolerance, measured e.g. as:

the discrepancy between a value provided in or derived from the particular test case, and the value reported by the wireless device, the discrepancy between a specified number of initial repetitions provided in or derived from the particular test case, and the observed number of initial repetitions, the discrepancy between a specified initial transmit power, provided in or derived from the particular test case, and the observed initial transmit power, the discrepancy between a specified time frame within which the device shall (re)select a cell, provided in or derived from the particular test case, and the observed time until the wireless device reselects a cell, and/or the discrepancy between a specified coverage level provided in or derived from the particular test case, and the coverage level reported by the wireless device.

The wireless device may for example evaluate and tune robustness of transmissions. The number of bursts and associated repetitions that have been used before a response is received from the network node may be analysed, and statistics are may be formed comprising for instance the average number of bursts that have been needed for receiving a RA response over the, say 20, last RA procedures. As such, the device/UE may keep statistics that may express the average number of retransmissions/bursts needed for the network node to respond to the outcome.

It should be mentioned that the metric on which radio conditions are mapped is a metric which is directly measurable, such as for example RSRP, RSRQ and/or RS-SINR. It is further a benefit if the metric to which the radio conditions are mapped is a standardised metric such that operation in the respective layers may be implemented independently. The standardised metric is thus used through the interface between the layers although the mapping may be from a more or less complex set of measurements.

Figure 1:
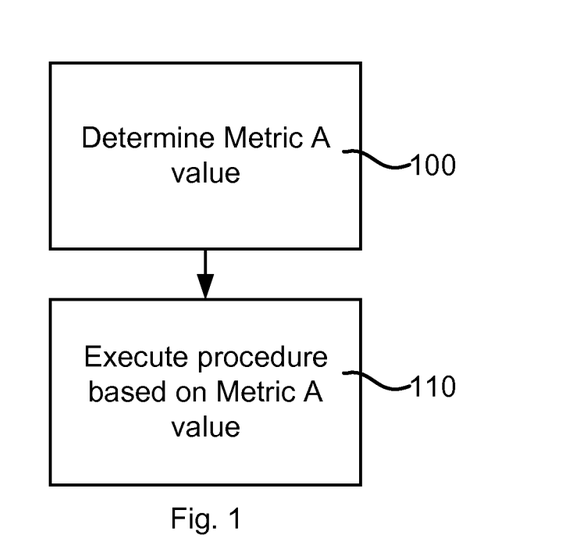
FIG. 1 schematically illustrates an approach for conventional coverage operation mode.
Figure 2:
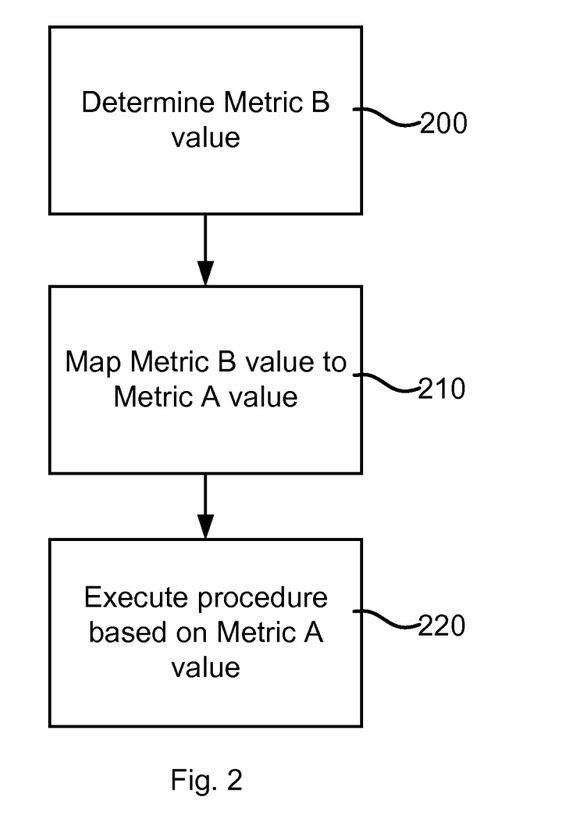
FIGS. 2 to 4 schematically illustrate approaches for enhanced coverage operation mode according to embodiments.
Figure 3:
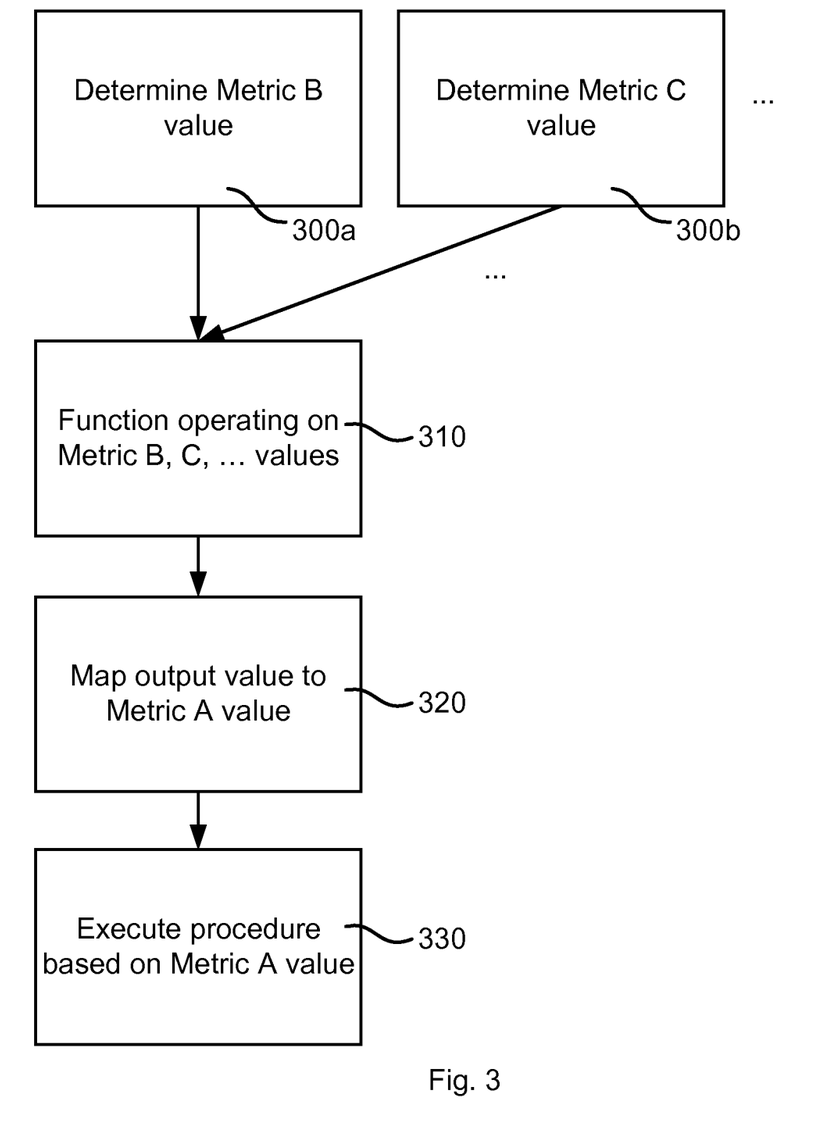
Figure 4:
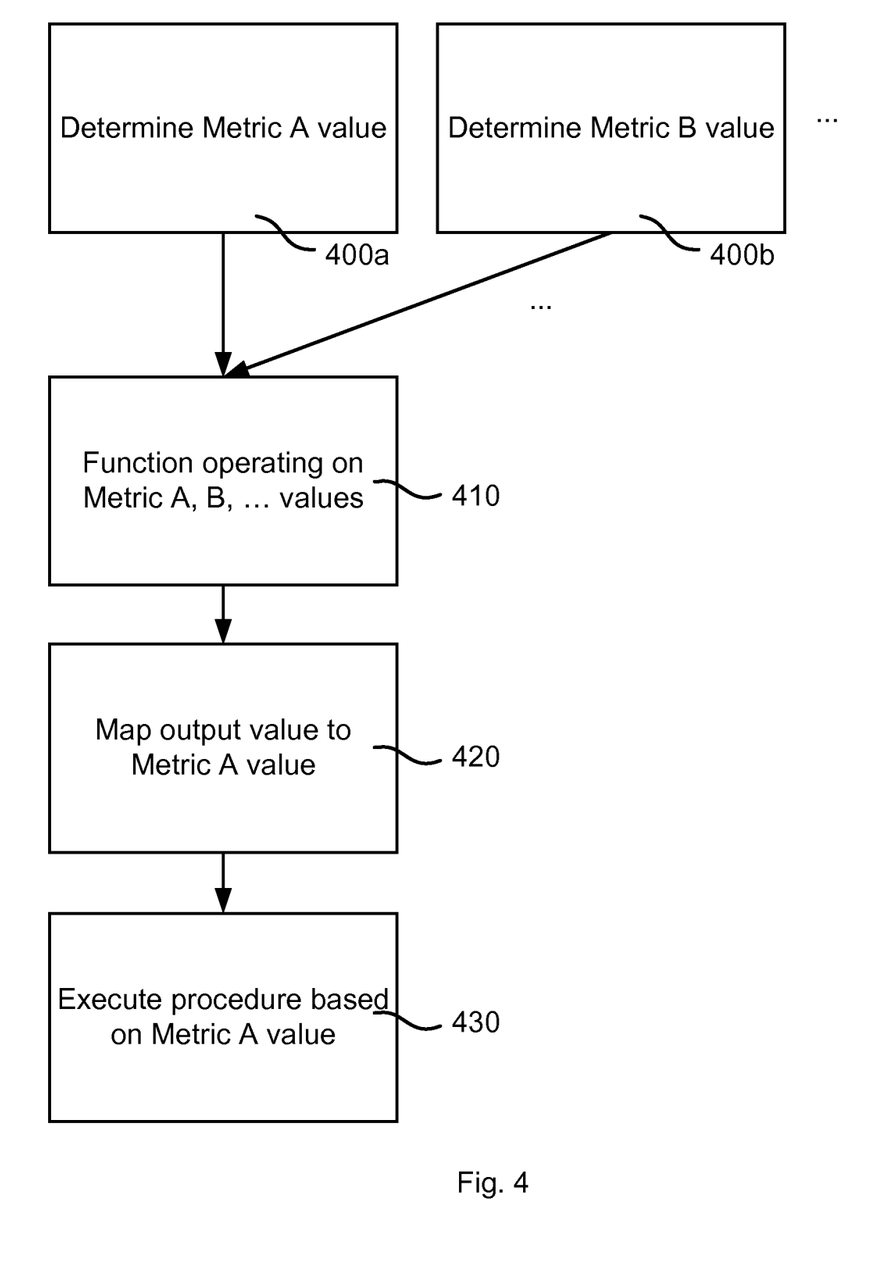

FIG. 1 illustrates conventional derivation 100 of the measurement quantity (e.g. RSRP, RSRQ, RS-SINR) where the quantity to be reported is measured directly, i.e. for conventional coverage operation. A radio resource handler executes 110 a procedure based on the metric provided by the determination. FIGS. 2-4 illustrate three exemplary alternative embodiments of the invention. In FIG. 2, a Metric B is determined 200 and the value of Metric A is derived from Metric B and then mapped 210 to Metric A. The radio resource handler executes 220 the procedure based on the mapped metric. In FIG. 3, Metrics B, C, . . . are determined 300*a*, 300*b*, . . . wherein a function operates 310 on the Metrics B, C, . . . and maps 320 the output to Metric A, i.e. the value of Metric A is derived from one or more functions operating on Metric values B and C etc. by being mapped 320 to Metric A. The radio resource handler executes 330 the procedure based on the mapped metric. The function(s) may include any one or a combination of (but not limited to):

Comparison to one or more absolute thresholds
Comparison to one or more relative thresholds
Transformation
Translation
Arithmetic operations (e.g. forming averages, forming linear combinations, forming ratios, forming products)
Determining a majority vote based on individual assessments for any and/or a combination of the Metrics
etc . . . .

In FIG. 4, the decision base may include a measured value of Metric A together with Metrics B, C, and so on. Thus, Metrics A, B, . . . are determined 400*a*, 400*b*, . . . wherein a function operates 410 on the Metrics A, B, . . . and maps 420 the output to Metric A, i.e. the value of Metric A is derived from one or more functions operating on Metric values B etc. as well from itself by being mapped 420 to Metric A. The radio resource handler executes 430 the procedure based on the mapped metric.

Figure 5:
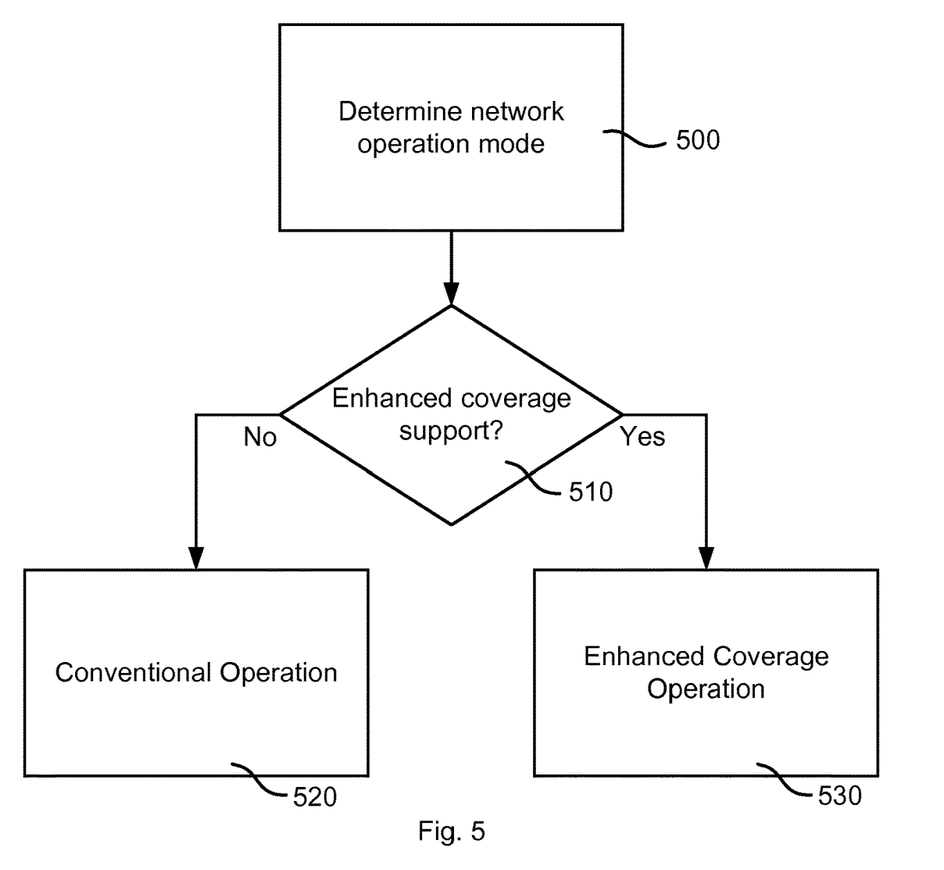
FIG. 5 schematically illustrates selection of operation mode according to an embodiment.

FIG. 5 illustrates how the wireless device initially selects mode of operation depending on broadcasted information from the network, retrieved now or at an earlier point. Thus, the network operation mode is determined 500. Concretely, if the network node indicates that coverage extension is in use, the wireless device may choose 510 to implement 530 the special mode of operation described above in FIGS. 2-4. Otherwise it is mandated by standard to operate 520 according to the conventional procedure as illustrated in FIG. 1.

In an alternative embodiment, the wireless device may follow a predetermined rule on selection of initial mode of operation. This rule may comprise e.g. that certain device categories or capabilities imply starting in a particular of the two modes of operations. E.g., a wireless device supporting enhanced coverage may, according to a predefined rule, be allowed to assume initially that it is operating in enhanced coverage.

Figure 6:
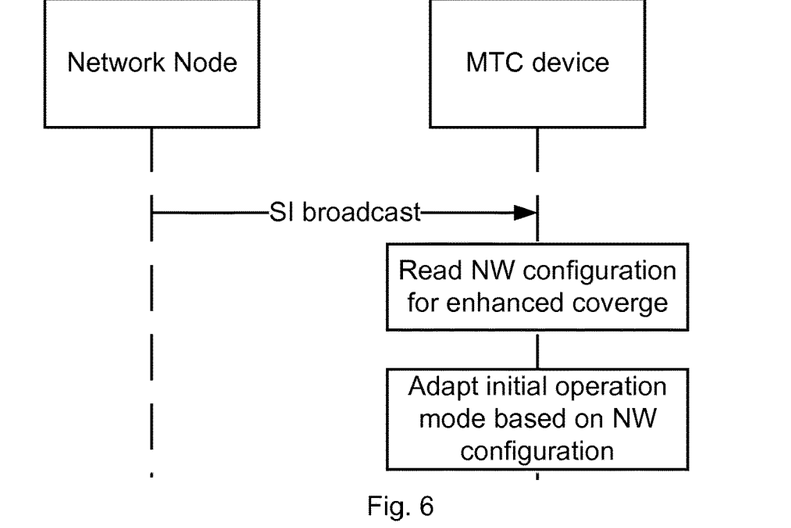
FIG. 6 illustrates broadcasting of network support for enhanced coverage.

FIG. 6 is a signal and operation diagram schematically illustrating how a network node (e.g. eNodeB) broadcasts system information that is retrieved by the wireless device. The system information carries an indication on that enhanced coverage is supported, e.g. in the master information block or the system information blocks 1 or 2, by which the wireless device adapts its operation accordingly, i.e. network configuration about whether to apply enhanced coverage operation is read from the broadcasted information and initial operation mode is adapted based on the network configuration.

Figure 7:
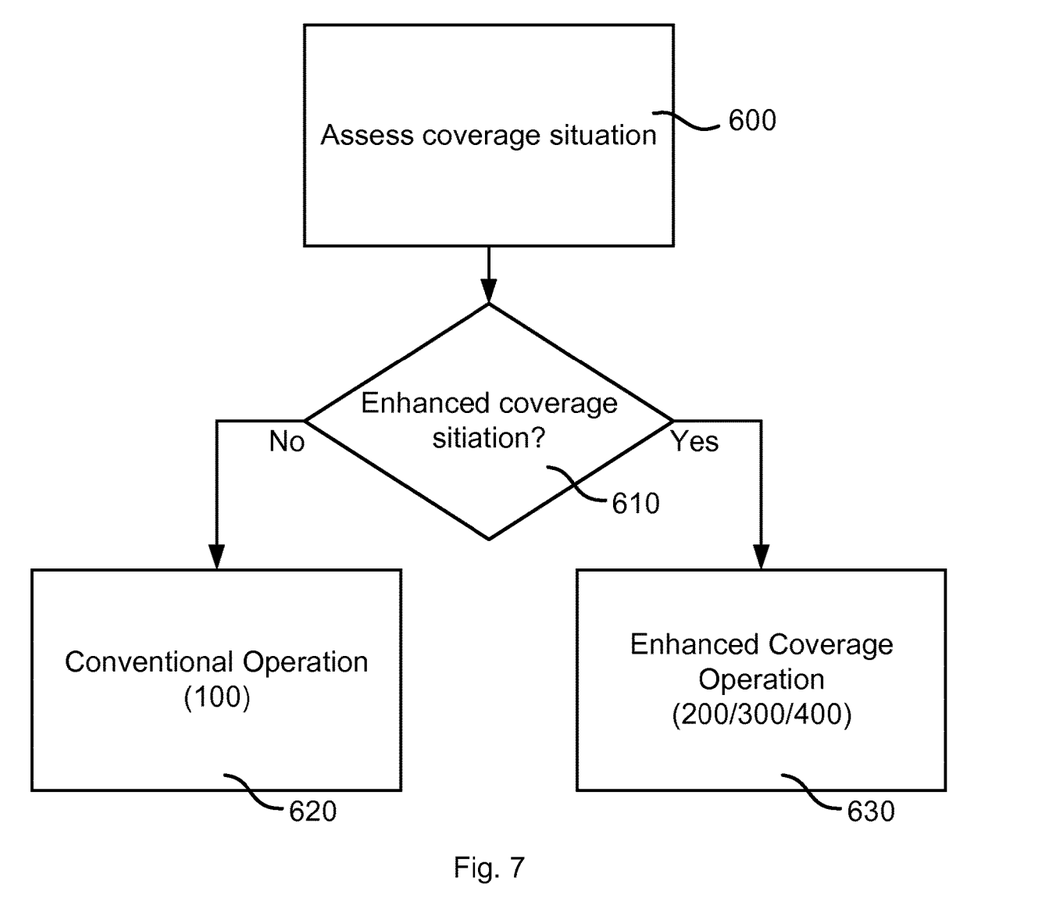
FIG. 7 illustrates change of operation mode depending on assessed coverage situation.

FIG. 7 illustrates how the wireless device after the initial selection of mode of operation reassesses 600 the required mode of operation based on the outcome of the initial mode of operation. For instance, after finding that although coverage enhancement is supported by the network the wireless device is operating in a radio environment where it is within the normal coverage of the cell (e.g. SINR −3 dB or higher), the wireless device selects 610 to perform 620 conventional mode of operation. Similarly, if a sudden degradation in radio conditions is detected, the wireless device selects 610 to perform 630 enhanced coverage operation. This assessment 600 may be carried out periodically, or may be triggered by events such as degradation or improvement of the radio conditions.

Figure 8:
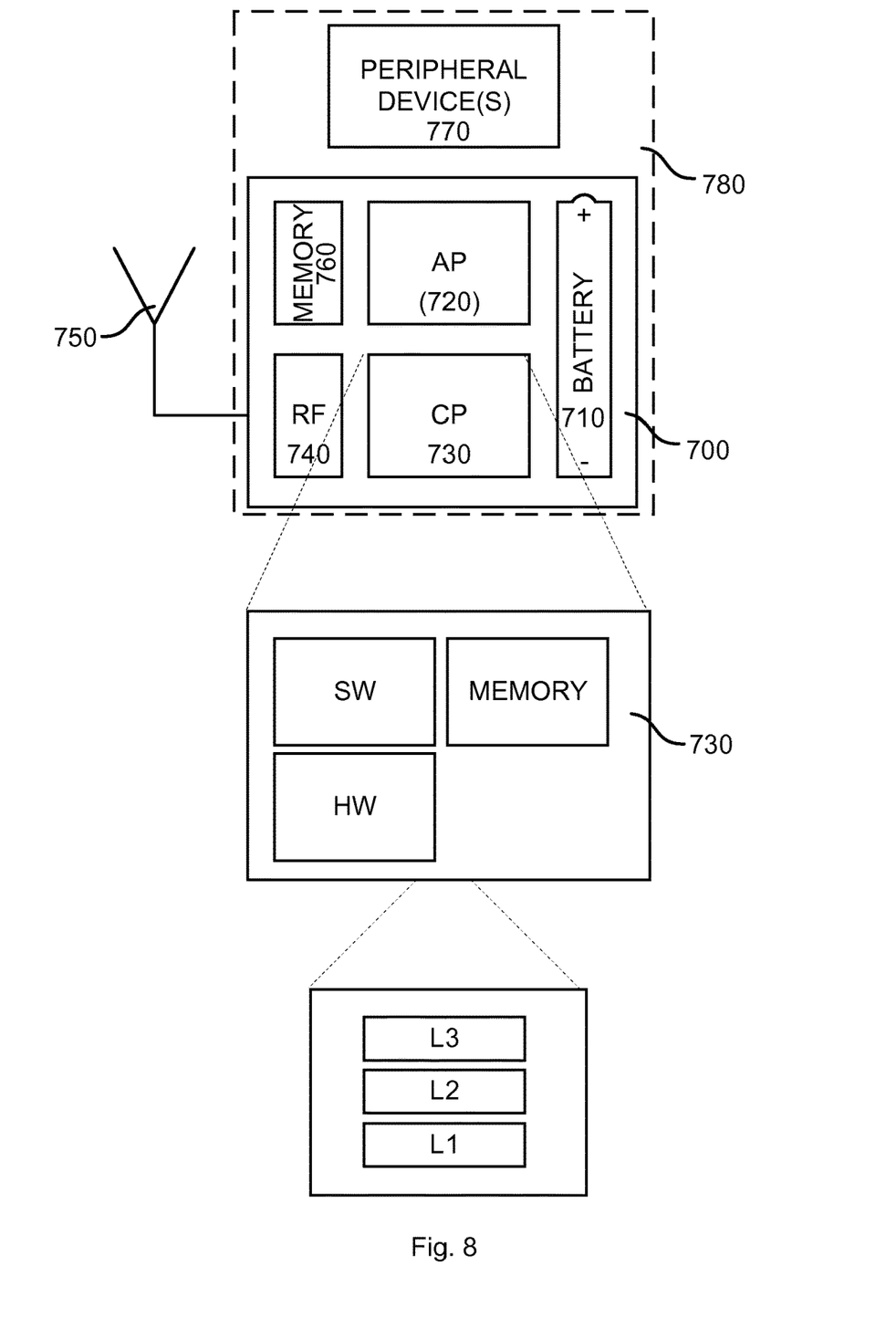
FIG. 8 is a block diagram schematically illustrating an MTC device according to an embodiment.

FIG. 8 illustrates an MTC device 700, comprising an antenna 750, RF circuitry 740, Communication Processor (CP) 730, Application Processor (AP) 720, External memory 760, and a battery 710. One or more peripheral devices 770 may be connected to the MTC device, e.g. sensor(s), meter(s), actuator(s), and/or reporter(s), forming an arrangement 780 enabled to perform MTC.

The solution according to some of the embodiments demonstrated above may be implemented within the CP 730, and particularly in Layer 1 of a layered protocol stack architecture. The CP 730 may be functionally and/or structurally implemented in one or more items.

As illustrated in FIG. 8, the CP 730 may comprise software parts, hardware parts and a memory. The CP 730 may handle the layered protocol stack architecture, which may comprise at least Layers 1-3.

Figure 9:
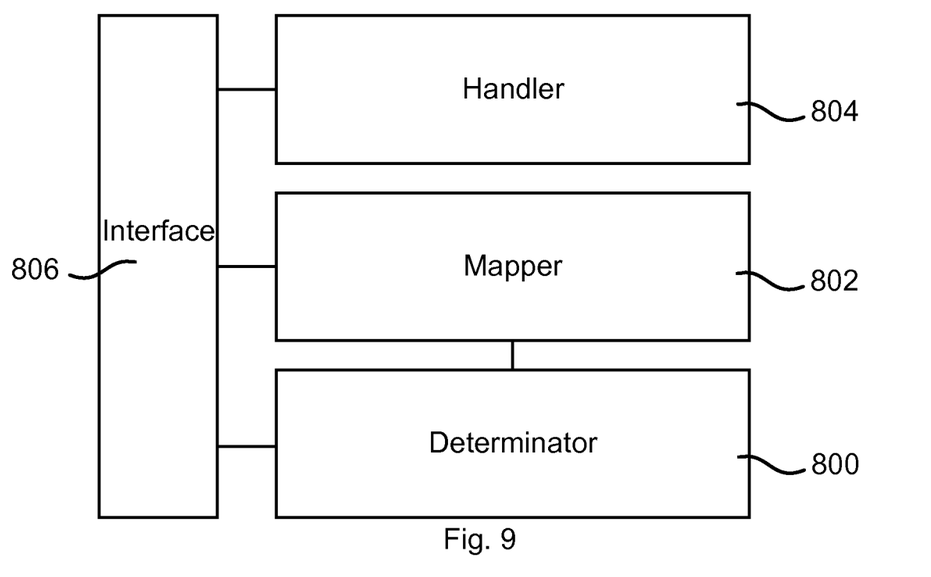
FIG. 9 is a block diagram schematically illustrating functional and/or structural elements for implementing an embodiment.
Figure 10:
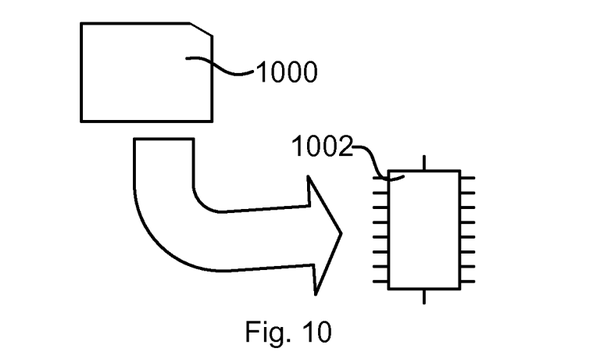
FIG. 10 schematically illustrates a computer-readable medium and a processing device.

FIG. 9 is a block diagram schematically illustrating functional and/or structural elements for implementing an embodiment. The elements may for example be present in the CP 730 as illustrated in FIG. 8. A determinator 800 is arranged to determine radio conditions according to any of the approaches demonstrated above. A mapper 802 is arranged to map the radio conditions to a metric. A handler 804 of radio resources is also provided, and an interface 806 is arranged to enable the determinator 800 and mapper 802 to report the radio conditions to the handler 804. The handler 804 is arranged to use the reported radio conditions and their mappings to the metric for radio resource handling, e.g. RRC, RLM, RRM, etc.

Figure 11:
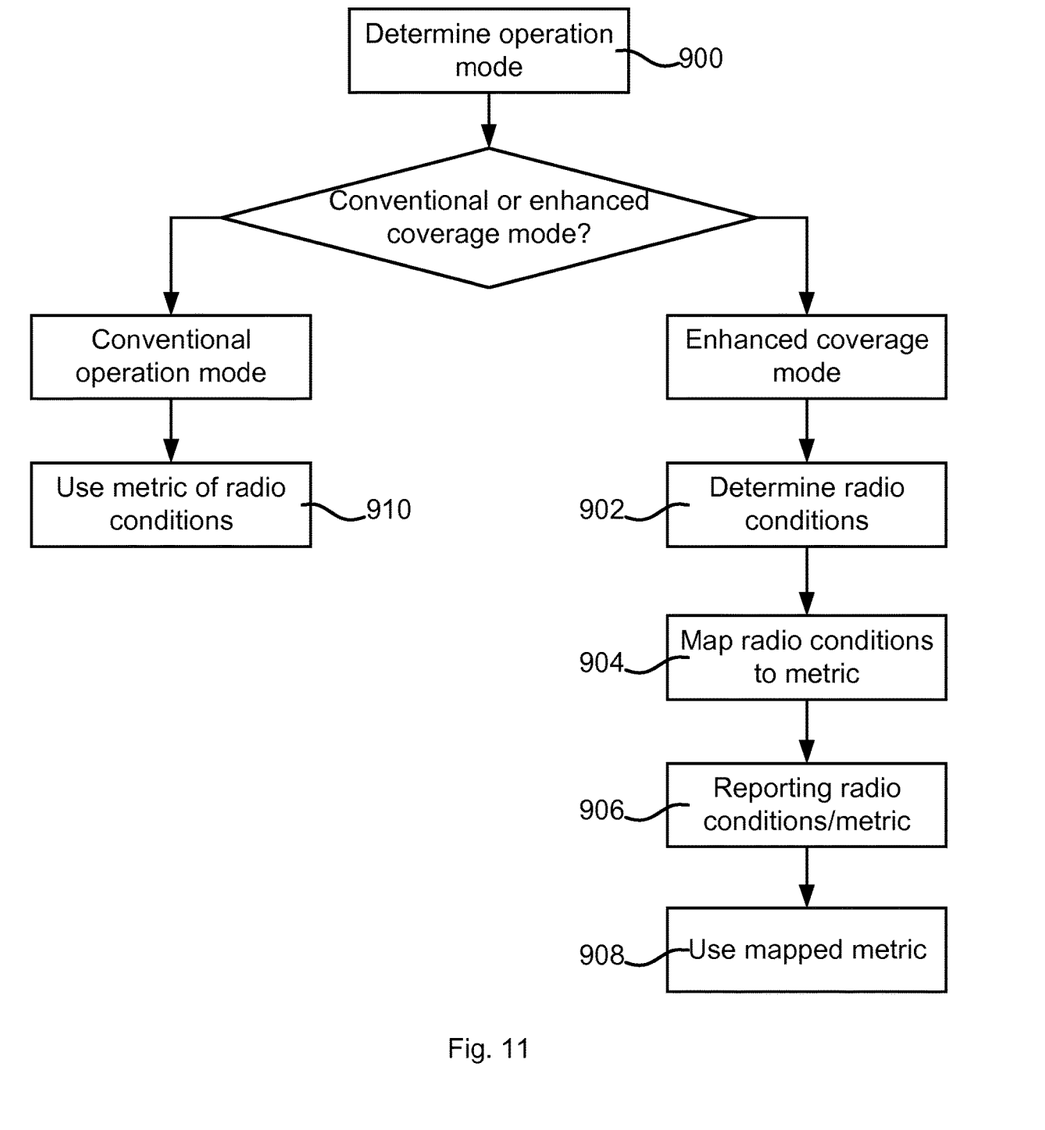
FIG. 11 is a flow chart illustrating a method according to an embodiment.

FIG. 11 is a flow chart schematically illustrating a method according to embodiments. The method may optionally include, e.g. as demonstrated with reference to FIGS. 5 to 7, by determining 900 whether the device is to operate in a conventional operation mode or operate in an enhanced coverage operation mode. If the device is to operate in the enhanced coverage operation mode, the using of the reported radio conditions and their mappings to the metric by the handler for radio resource operations comprises operating based on the metric to which the radio conditions are mapped. Thus, in that case, the method proceeds with determining 902 radio conditions, mapping 904 the radio conditions to a metric, and reporting 906 the radio conditions to a handler of radio resources. The handler for radio resource operations uses 908 mapped metric for performing its execution of radio resource handling. On the other hand, if the device is to operate in the conventional operation mode, the handler for radio resource operations uses 910 metrics provided by the reported radio conditions, i.e. the measured metric.

The methods according to the present invention is suitable for implementation with aid of processing means, such as computers and/or processors, especially for the case where the processing element 730 demonstrated above comprises a processor handling adapting radio resources based on physical conditions in a device for wireless communication. Therefore, there is provided computer programs, comprising instructions arranged to cause the processing means, processor, or computer to perform the steps of any of the methods according to any of the embodiments described with reference to FIGS. 1 to 7 and 10. The computer programs preferably comprises program code which is stored on a computer readable medium 1000, as illustrated in FIG. 11, which can be loaded and executed by a processing means, processor, or computer 1002 to cause it to perform the methods, respectively, according to embodiments of the present invention, preferably as any of the embodiments described with reference to FIGS. 1 to 7 and 10. The computer 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and computer 1002 in FIG. 11 should be construed to be for illustrative purposes only to provide understanding of the principle, and not to be construed as any direct illustration of the elements.

The invention claimed is:

1. A method of adapting radio resources based on radio conditions measured by a device for wireless communication, the method comprising:
   determining radio conditions;
   mapping the radio conditions to a metric,
      wherein the mapping radio conditions to the metric comprises mapping the radio conditions to reference signal received power,
      wherein a value of the metric is derived from one or more functions operating on one or more metrics,
      wherein the one or more functions comprises determining a majority vote based on individual assessments for any and/or a combination of the one or more metrics, and
         wherein output of the one or more functions is mapped to the metric;
   reporting the radio conditions to a handler of radio resources;
   determining whether the device is to operate in a conventional operation mode or an enhanced coverage operation mode based on broadcasted system information received from a network node with an indication to the device to operate either in the conventional operation mode or the enhanced coverage operation;
   responsive to determining the device is to operate in the enhanced coverage operation mode, using the reported radio conditions and their mappings to the metric by the handler for radio resource operations by operating based on the metric to which the radio conditions are mapped; and
   responsive to determining the device is to operate in the conventional operation mode, using the reported radio conditions by the handler for radio resource operations by operating based on metrics provided by the reported radio conditions.

2. The method of claim 1, wherein the determining the radio conditions comprises measuring reference signal received power.

3. The method of claim 1, wherein the determining the radio conditions comprises measuring reference signal received quality.

4. The method of claim 1, wherein the determining the radio conditions comprises analyzing message decoding statistics.

5. The method of claim 1, wherein the determining the radio conditions comprises determining cell detection times.

6. The method of claim 1, wherein the determining the radio conditions comprises analyzing interference history.

7. The method of claim 1, further comprising mapping the radio conditions to reference signal received quality.

8. The method of claim 1, further comprising mapping the radio conditions to signal-to-interference-and-noise ratio of reference signals.

9. The method of claim 1, wherein the handler of radio resources is operative to handle radio resource control.

10. The method of claim 1, wherein the handler of radio resources is operative to handle radio link management.

11. The method of claim 1, wherein the handler of radio resources is operative to handle radio resource management.

12. The method of claim 1, wherein the handler of radio resources is operative to handle cell selection.

13. The method of claim 1, wherein the handler of radio resources is operative to handle cell re-selection.

14. The method of claim 1, wherein the handler of radio resources is operative to handle initial physical random access channel repetition.

15. The method of claim 1, wherein the handler of radio resources is operative to handle initial physical random access channel transmit power selection.

16. The method of claim 1, wherein the handler of radio resources is operative to handle mobility measurement reporting.

17. The method of claim 1, wherein the handler of radio resources is operative to handle mobility measurement logging.

18. The method of claim 1, wherein the handler of radio resources is operative to handle coverage reporting.

19. A device arranged for wireless communication comprising:
processing circuitry configured to function as:
a determinator circuitry configured to determine radio conditions;
a mapper circuitry configured to map the radio conditions to a metric;
a handler of radio resources,
wherein map the radio conditions to the metric comprises mapping the radio conditions to reference signal received power,
wherein a value of the metric is derived from one or more functions operating on one or more metrics,
wherein the one or more functions comprises determining a majority vote based on individual assessments for any and/or a combination of the one or more metrics, and
wherein output of the one or more functions is mapped to the metric;
an interface circuitry configured to enable the processing circuitry to report the radio conditions to the handler of radio resources,
the determinator circuitry is further configured to determine whether the device is to operate in a conventional operation mode or an enhanced coverage operation mode based on broadcasted system information received from a network node with an indication to the device to operate either in the conventional operation mode or the enhanced coverage operation mode;
responsive to determining the device is to operate in the enhanced coverage operation mode, using the reported radio conditions and their mappings to the metric by the handler for radio resource operations by operating based on the metric to which the radio conditions are mapped; and
responsive to determining the device is to operate in the conventional operation mode, using the reported radio conditions by the handler for radio resource operations by operating based on metrics provided by the reported radio conditions.

20. A non-transitory computer readable recording medium storing a computer program product for adapting radio resources based on radio conditions measured by a device for wireless communication, the computer program product comprising software instructions which, when run on processing circuitry of the device, causes the device to:
determine radio conditions;
map the radio conditions to a metric,
wherein the mapping radio conditions to the metric comprises mapping the radio conditions to reference signal received power,
wherein a value of the metric is derived from one or more functions operating on one or more metrics,
wherein the one or more functions comprises determining a majority vote based on individual assessments for any and/or a combination of the one or more metrics, and
wherein output of the one or more functions is mapped to the metric;
report the radio conditions to a handler of radio resources;
determine whether the device is to operate in a conventional operation mode or an enhanced coverage operations mode based on broadcasted system information received from a network node with an indication to the device to operate either in the conventional operation mode or the enhanced coverage operation mode;
responsive to determining the device is to operate in the enhanced coverage operation mode, using the reported radio conditions and their mappings to the metric by the handler for radio resource operations by operating based on the metric to which the radio conditions are mapped; and
responsive to determining the device is to operate in the conventional operation mode, using the reported radio conditions by the handler for radio resource operations by operating based on metrics provided by the reported radio conditions.

21. The method of claim 1, wherein the one or more functions further comprise one or a combination of:
comparison to one or more absolute thresholds;
comparison to one or more relative thresholds;
transformation;
translation; and
arithmetic operations.

* * * * *